July 14, 1953     E. DAVIS ET AL     2,645,249
PLASTIC RESIN TUBING AND METHOD OF MAKING THE SAME
Filed April 30, 1949
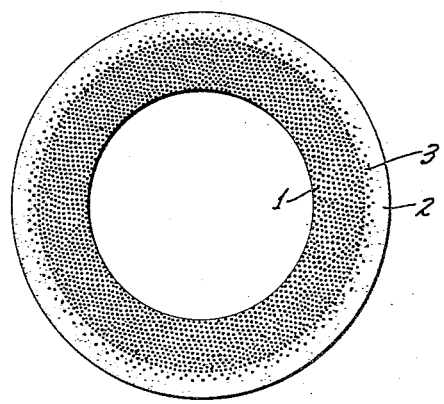
ELBERT DAVIS &
OSCAR STAHL,
INVENTORS.
BY *Gerald H. Peterson*
ATTORNEY.

Patented July 14, 1953

2,645,249

UNITED STATES PATENT OFFICE

2,645,249

PLASTIC RESIN TUBING AND METHOD OF MAKING THE SAME

Elbert Davis, North Hollywood, and Oscar C. Stahl, Los Angeles, Calif., assignors, by mesne assignments, to said Oscar C. Stahl, Los Angeles, Calif.

Application April 30, 1949, Serial No. 90,667

3 Claims. (Cl. 138—49)

This invention relates to a plastic tube having multiple layers in which each layer has properties rendering it especially suitable for a purpose differing from the other layer, particularly such a tube useful as a garden hose, and, more particularly, such a tube comprising an inner layer of polyvinyl chloride resin and an outer layer of polyvinyl chloride resin, the inner layer of which contains additive agents, particularly plasticizer, giving it particularly the properties of high tensile and high burst strength, and the outer layer of which contains additive agents, particularly plasticizer and weathering protective agent, giving the outer layer different properties, particularly high abrasion resistance, weather resistance, particularly including resistance to high temperature and light stability and light screening, which protect the inner layer as well as the outer layer.

The production of a plastic tube, especially one useful as a garden hose, for example, particularly from polyvinyl chloride resin, is generally known in the art. The requirements of a plastic tube useful as a garden hose, for example, are such that plasticizers, stabilizers, light screening agents, etc. have been used to give the extruded tubing many desired properties of flexibility, tensile strength, burst strength, abrasion resistance, cold-crack resistance, weather resistance, light stability, color permanence, etc. Even though many advances have been made with respect to a careful balance of the relative proportion and selection of such additive agents to the extruded resin to obtain a satisfactory extruded tubing, particularly one having properties useful for a garden hose, it still has not been possible to obtain a tubing fully satisfactory in all respects.

In accordance with this invention, however, it has been discovered that the solution to this real and difficult problem lies in making such a tubing in at least two layers, as more particularly pointed out below and including an inner layer having such properties as flexibility, high tensile and high burst strength, and an outer layer having different properties, particularly including high abrasion and weather resistance, light stability and light screening. In other words, the inner layer is made of a plastic resin formulation containing such additives as will produce a material meeting the requirements for the inner layer. In a garden hose, for example, the inner layer must carry the water or other fluid under pressure, and accordingly must be able to withstand the physical and chemical properties of the fluid and have sufficiently high tensile and burst strength to withstand the pressure and dynamic effects of the fluid carried by the tubing.

The outer layer, on the other hand, in accordance with this invention, is made to have a high abrasion resistance to withstand wear and tear, a high cold-crack resistance to withstand cracking resulting from low temperatures, high weather resistance, particularly resistance to elevated temperatures, and light stability to inhibit or prevent deterioration of the resin due to light rays to which it is sensitive, particularly certain ultraviolet wave lengths, and light screening which protects not only the outer layer but also the inner layer from any harmful effects of radiation, particularly wave lengths in the ultraviolet.

In accordance with this invention, the tubing may be made by extruding the inner layer in a customary manner known to the art, but with the addition of only such, and only such proportions of, additive agents as will give the inner layer the required properties for its intended use, particularly flexibility, tensile strength and burst strength. As is known in the art, this inner tube may be prepared by conventional extruding techniques, that is, the raw materials are mixed, fused, granulated, charged into the extruder, and formed into a continuous tube by the simultaneous action of heat and pressure. The hot plastic mass is made homogeneous by the mechanical working action of the extruder screw, and becomes semi-fluid because of its thermoplastic nature. The plastic mass is softened sufficiently by heat to facilitate extrusion of the material in the form of a continuous tube. Immediately water cooling is employed to harden and toughen the thermoplastic material and to retain the round tubular shape.

The outer layer of plastic resin may then be applied to the inner tubing in the form of a liquid such as a plastisol or organosol. As pointed out above, the outer layer need not have properties of high tensile strength and high burst strength, but the plastic resin formulation of the outer layer should have the properties required for the outer layer, particularly including abrasion and weather resistance. This may be accomplished by adding to the resin used for the outer layer the proper selection of and relative proportions of the desired additive agents to impart to the outer layer the desired properties.

The plastic resin formulation intended to form the outer layer is preferably applied to the outer portion of the inner tubing in such a manner as to fuse or otherwise coalesce the outer layer to the inner tubing to make it integral therewith. This may be done by heating the outer surface of the inner tubing to such a softening temperature that when the resin intended for the outer layer is applied, as by spraying or dipping, it will tend to fuse or coalesce with the outer surface of the inner tubing. This fusing may be completed by a further heating of the applied outer layer, as in a hot air bath or with a bank of infra-red radiant heaters, to a temperature sufficient to gel and complete the plasticization of the resin particles of the outer layer. Simultaneously with such gelling, the outer layer is completely fused with the inner tubing, forming a substantially unitary or integral tubing structure. Instead of heating the outer surface of the inner tubing before applying the outer layer, it may be applied without such heating, and after application the outer layer can be plasticized and fused to the inner layer by heating as described. This two-layer tubing, from outside to inside, is a single continuous system composed of plastic resin from inside to outside surface but with different chemical additives or different proportions or concentrations thereof in the outside and inside layers. In other words, where polyvinyl chloride resin is used, for example, the final product is one continuous polyvinyl chloride resin structure with all the advantages of a homogeneous system but with the dissolved or suspended chemical additives different in nature and quantity from the inside to the outside surfaces in accordance with the varying requirements of the respective layers or the particular locality or position from outside surface to inside surface of the tubing.

The inner tubing, in accordance with this invention, might consist of a polyvinyl chloride resin properly plasticized for adequate flexibility, tensile and burst strength, and also containing a wax-like additive, such as carnauba wax, to protect the inside surface of the hose against water penetration and extraction. It might also contain low-cost plasticizer and low-cost extenders or fillers which could not ordinarily be used in a garden hose formulation, made in accordance with known methods, either because of poor weathering characteristics or because of the rough, unsightly extruded surface which results from their use.

The outside layer of the garden hose, though composed basically of the same polyvinyl chloride resin as the inner tube, may contain such specific additives as organic or inorganic salts of salicyclic acid for the purpose of protecting the inner tube from the harmful ultraviolet rays of the sun. The outer layer might also contain an acid absorbing antioxidant, such as dibasic lead phosphite, to protect the hose both during processing and in final use from the deleterious effects of heat, light, and oxidation. Other ingredients may be added to the outer layer of polyvinyl chloride for specific improvement of various qualities such as weather resistance, color permanence, surface finish, abrasion resistance, low temperature crack resistance, etc. Many of the additives which have been described as being desirable at the outer surface of the hose could not be tolerated throughout the whole body of the hose. For instance, certain ingredients which might be desirable at the surface because of cold-crack resistance might cause low burst strength or excessive hardening by water extraction when used in the entire body of the hose. Conversely, certain fillers used throughout the hose would produce a hose of extremely poor color and surface finish and for these reasons would not ordinarily be used. Thus, the unique feature of the present invention is that by a new process of manufacture, it is possible to produce a finished plastic tubular structure which is essentially continuous and homogeneous insofar as its basic resin structure is concerned, but which contains localized concentrations of some of the additive agents either in the inner or the outer layers of the tube, wherever their presence is of greatest advantage.

In order to further illustrate and exemplify this invention, reference may be made to Figure 1 of the drawing which schematically shows a cross-section of a garden hose made in accordance with the invention, but considerably enlarged for illustration. At 1 is an inner tubing of polyvinyl chloride resin extruded in a conventional manner, having such additives as to render it sufficiently flexible for a garden hose and to give it high tensile and burst strength. At 2 is an outer layer of polyvinyl chloride resin having different properties, particularly including high abrasion resistance and light stability and screening. These layers 1 and 2 are fused together and intermixed as at 3, forming a substantially continuous tubular structure of plasticized polyvinyl chloride resin. It is a significant feature of this invention that layers 1 and 2 have no distinct interface, but are fused and intermixed to form an integral structure.

This invention will be further illustrated and exemplified by the following specific examples:

*Example 1*

100 lbs. of polyvinyl chloride resin, such as is customarily used for extruding into tubing, as for garden hose, such as, for example, a polyvinyl chloride resin having a particle size of 100% passing 42 mesh, 5% retained on 100 mesh, and 50% retained on 200 mesh, and an average molecular weight of about 100,000, was mixed with 50 lbs. of di(2-ethyl hexyl) phthalate plasticizer and 5 lbs. of basic lead carbonate (white lead). These were milled at a temperature of about 320° F. on a 2-roll mill into sheet form to make a homogeneous mixture. A sheet of about ¼ inch in thickness was stripped and cut into granules of about ⅛ inch rough cubes. This material was extruded as a tube, in a manner known in the art, at approximately 350° F. in a conventional plastics extruder to produce a tube of ½ inch inside diameter and about 0.10 inch wall thickness. The extruded tube was then passed into a water-cooling bath which cooled the tube to about 100° F. to cause it to hold its shape.

Excess water was then removed from the surface of the tube by wiping and the tube was conducted through a hot air bath to rapidly heat substantially only the outside surface of the tube to about 350° F. without raising the temperature of the whole cross-section of the tube; that is, without heating to any considerable depth. This brought the surface of the tube up to the temperature at which the subsequent layer, described below, would fuse therewith. In contrast to the preparation of the plastic used for the above-described extruded tube, the plastic for the second layer was prepared as follows: 100 lbs. of polyvinyl chloride resin, having a particle size of about 1 to 1½ microns, and an average molecular weight of about 60,000, was mixed with 80 lbs. of di(2-ethyl hexyl) phthalate plasticizer and 5 lbs. of basic lead carbonate (white lead). These components were mixed to make a plastisol (a resin-plasticizer dispersion in liquid form) by milling on a 3-roll water-cooled paint mill. The resulting viscous liquid was then ready for use in applying the outer layer.

The plastisol was then applied to the preheated tubing, described above, having its surface heated to about 350° F. by means of a pressure-type spray gun to produce a layer of about 0.020 inch thick. When the plastisol contacted the heated surface of the tube, it gelled sufficiently to produce a fragile, uniform layer which was nevertheless sufficiently strong to remain on the tube and not run. The tube with the gelled layer applied was then heated to raise the temperature of substantially only the outer layer to about 350° F. to completely plasticize the outer layer and effect a complete fusion with the inner layer. The tubing was then immediately cooled in a water bath to a temperature of about 80° F. to harden the material.

The resulting tubing had an inner portion of lower plasticizer content than the relatively thin outer portion, giving the tube an inner portion with high tensile and burst strength and an outer portion having high abrasion and weather resistance, and a higher cold-crack resistance.

*Example 2*

The material for extruding the tubing was made up as in Example 1 above except that 1 lb. of carnauba wax was mixed with the 100 lbs. of polyvinyl chloride resin, 50 lbs. of di(2-ethyl hexyl) phthalate plasticizer and 5 lbs. of basic lead carbonate. The carnauba wax was added to impart water resistance to the extruded tube.

The plastisol used for the outer layer was made up of 100 lbs. of the same polyvinyl chloride resin used for the plastisol of Example 1, 80 lbs. of di(2-ethyl hexyl) phthalate, 3 lbs. of barium ricinoleate, and 1 lb. of phenyl salicylate. The barium ricinoleate was added to impart a smooth, glossy finish or surface to the outer layer and the phenyl salicylate added to act as a light screen, that is, an ultraviolet light absorber, particularly the ultraviolet wave lengths which tend to decompose the polyvinyl resin or plasticizer, or both.

The tubing was extruded and the plastisol layer applied, as in Example 1 above. The resulting tubing had an inner portion which had a high tensile and burst strength and was water-resistant, while the outer layer fused thereto had a high abrasion weather, and cold break resistance, a smooth finish and supplied protection from ultraviolet light to all the material within the whole tube structure.

*Example 3*

The material for extruding the tubing was made up as in Example 1 with 100 lbs. of polyvinyl chloride resin (as in Example 1), 30 lbs. of di(2-ethyl hexyl) phthalate plasticizer, 20 lbs. of Sovaloid (a high molecular weight, aromatic, petroleum hydrocarbon extender), 20 lbs. of clay filler, and 0.02 lb. of aniline red.

The plastisol used for the outer layer was made up of 100 lbs. of the same polyvinyl chloride resin used for the plastisol of Example 1, 40 lbs. di(2-ethyl hexyl) azelate, 20 lbs. of di(2-ethyl hexyl) adipate, 20 lbs. of di-capryl sebacate, 1 lb. cadmium selenide red, and 3 lbs. dibasic lead phosphite. The di(2-ethyl hexyl) azelate imparts permanent flexibility because of its low volatility and good low temperature flexibility.

The di(2-ethyl hexyl) adipate imparts good low temperature properties and good light stability. The di-capryl sebacate imparts good low temperature properties. The cadmium selenide red imparts a permanent red color, and the dibasic lead phosphite functions as an anti-oxidant and light stabilizer.

The tubing was extruded and the plastisol layer applied as in Example 1 above. The resulting tubing had an inner portion which had a high tensile and burst strength but was made of relatively low-cost materials which do not give a product with satisfactory finish and surface properties and containing a light fugitive red dye, while the outer layer fused thereto had an excellent finish and excellent surface properties, particularly an excellent surface finish, good abrasion and weather resistance, permanent color, good resistance to cracking, particularly at low temperatures, permanent flexibility and light stability.

*Example 4*

The material for extruding the tubing was made up of the following:

100 lbs. polyvinyl chloride resin as in Example 1
30 lbs. di-capryl phthalate
10 lbs. dibutyl phthalate
10 lbs. Sovaloid C
30 lbs. chalk filler
1 lb. carnauba wax The plastisol used for the outer layer was made up from the following:

100 lbs. polyvinyl chloride resin (as for the plastisol of Example 1)
20 lbs. di(2-ethyl hexyl) phthalate
20 lbs. di(2-ethyl hexyl) sebacate
10 lbs. di(2-ethyl hexyl) azelate
10 lbs. di-benzyl sebacate
20 lbs. di(2-ethyl hexyl) adipate
1 lb. dibasic lead stearate
3 lbs. dibasic lead phthalate
2 lbs. barium ricinoleate
0.5 lb. lead salicylate
0.1 lb. titanium dioxide (TiO$_2$)

The di(2-ethyl hexyl) sebacate, di(2-ethyl hexyl) azelate and di-benzyl sebacate impart permanent flexibility because of their extremely low volatility and improve the low temperature flexibility and resistance to cracking. The di(2-ethyl hexyl) adipate imparts good low temperature flexibility as well as good light stability. The dibasic lead stearate and barium ricinoleate function as heat stabilizers and impart improved surface finish. The dibasic lead phthalate acts as a light stabilizer and the lead salicylate as a light screen to protect the contents of the entire tube structure. The titanium dioxide is a white pigment which acts as an opacifier.

The tubing was extruded and the plastisol layer applied as in Example 1 above. The resulting tubing had an inner portion with a high tensile and burst strength and water resistance but was made of relatively low-cost materials which do not give a product with satisfactory finish and surface properties, while the outer layer fused thereto had an excellent surface finish and excellent surface properties, particularly good abrasion and weather resistance, permanent color, good resistance to cracking, particularly at low temperatures, permanent flexibility and light stability.

Example 5

The material for extruding the tubing was made up as follows:

150 lbs. reclaimed plasticized polyvinyl chloride resin scrap, containing 67% resin
30 lbs. clay filler
1 lb. carnauba wax
1 lb. chrome green pigment The plastisol used for the outer layer was made up of the following:

100 bs. polyvinyl chloride resin (as for the plastisol of Example 1)
10 lbs. di(2-ethyl hexyl) phthalate
10 lbs. di-benzyl sebacate
20 lbs. di(2-ethyl hexyl) azelate
20 lbs. di(2-ethyl hexyl) adipate
20 lbs. di(2-ethyl hexyl) sebacate
1 lb. barium ricinoleate
1 lb. indanthrene green pigment
3 lbs. dibutyl tin dilaurate
2 lbs. dibutyl tin maleate
1 lb. phenyl salicylate The respective ingredients used in the plastisol of this example were added for the purpose pointed out in the preceding example, and the dibutyl tin dilaurate and the dibutyl tin maleate were respectively added as a heat and light stabilizer and a heat, light, and color stabilizer.

The tubing was extruded and the plastisol layer applied as in Example 1 above. The resulting tubing had an inner portion with a high tensile and burst strength but was made of relatively low-cost materials which do not give a product with satisfactory finish and surface properties, while the outer layer fused thereto had an excellent surface finish and excellent surface properties, particularly good abrasion and weather resistance, permanent color, good resistance to cracking, particularly at low temperature, permanent flexibility and light stability.

An organosol (resin-plasticizer solvent diluent) dispersion may be used instead of a plastisol and the diluent is evaporated, its only function being to lower the viscosity of the plastic resin as applied as the outer layer. Use of an organosol dispersion of plastic resin allows the application of higher resin content with respect to resin and plasticizer formulations, if desired. Also, a somewhat higher gloss may be obtained by using an organosol.

Instead of polyvinyl chloride resin, other resins may be used, such as, for example, vinyl chloride-vinyl acetate copolymers, vinyl chloride-vinylidene copolymers.

It will be understood that the specific embodiments of this invention described above are intended to illustrate and exemplify the invention and are not necessarily intended as a limitation thereon and that modifications of this invention may be made within the scope of the following claims which define the invention sought to be covered by Letters Patent.

We claim:

1. A flexible tubing of a thermoplastic resin selected from the group consisting of polyvinyl chloride, vinyl chloride-vinyl acetate copolymers, and vinyl chloride-vinylidene copolymers, comprising an extruded, seamless, flexible inner tubing of said resin having a substantially concentric outer layer of said resin fused thereto and integral therewith to form a substantially homogeneous tube of said resin, the resin of said extruded inner tube containing at least one additive which imparts high tensile and burst strength and the resin of said outer layer containing at least one additive which imparts high abrasion and weather resistance.

2. A flexible tubing of a thermoplastic resin selected from the group consisting of polyvinyl chloride, vinyl chloride-vinyl acetate copolymers, and vinyl chloride-vinylidene copolymers, comprising an extruded, seamless, flexible inner tubing of said resin having a substantially concentric outer layer of said resin fused thereto and integral therewith to form a substantially homogeneous tube of said resin, the resin of said extruded inner tube containing at least one additive which imparts high tensile and burst strength and the resin of said outer layer containing at least one additive which imparts high abrasion, weather resistance, light stability and ability to absorb ultraviolet light.

3. The method of making an integral flexible tubing of a thermoplastic resin selected from the group consisting of polyvinyl chloride, vinyl chloride-vinyl acetate copolymers, and vinyl chloride-vinylidene copolymers, comprising the steps of heat softening the outer surface of an extruded tube of said resin containing a first group of high-melting-point wax plasticizers which impart high tensile and burst strength to said extruded tube, applying a layer of said resin in the form of a dispersion of resin in plasticizer to said softened outer surface of said extruded tube to form a concentric outer layer thereon, said dispersion incorporating a second group of plasticizers containing salts of salicylic acid and acid absorbing antioxidants which impart high abrasion and weather resistance to said outer layer, heating said outer layer to about 350° F. to gel and fuse it to the outer surface of said extruded inner tube and cooling said outer layer.

ELBERT DAVIS.
OSCAR C. STAHL.

References Cited in the file of this patent

UNITED STATES PATENTS

| Number | Name | Date |
|---|---|---|
| 1,895,022 | Chandler | Jan. 24, 1933 |
| 2,027,961 | Currie | Jan. 14, 1936 |
| 2,053,112 | Schnabel | Sept. 1, 1936 |
| 2,176,997 | Marini | Oct. 24, 1939 |
| 2,245,708 | Patton | June 17, 1941 |
| 2,453,052 | Van Etten | Nov. 2, 1948 |